3,177,662
GAS GENERATOR
Willem Mans, 86 Monnikensteeg, Arnhem, Netherlands
Filed Sept. 4, 1962, Ser. No. 221,157
15 Claims. (Cl. 60—39.69)

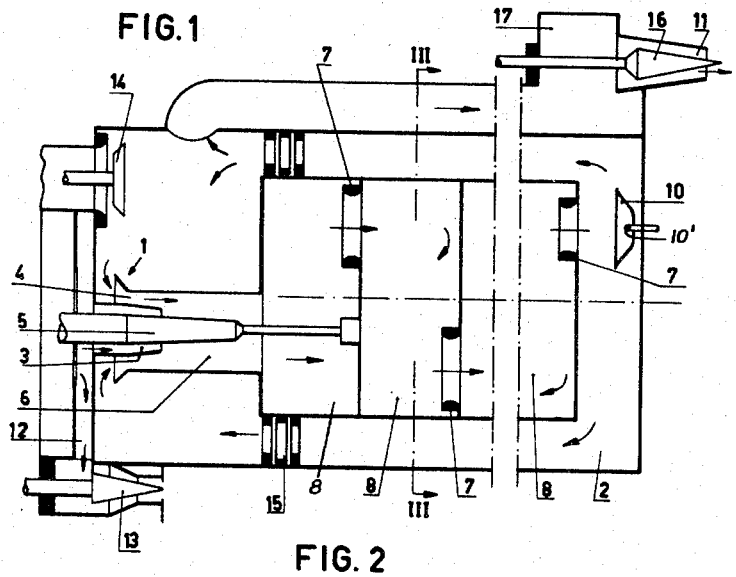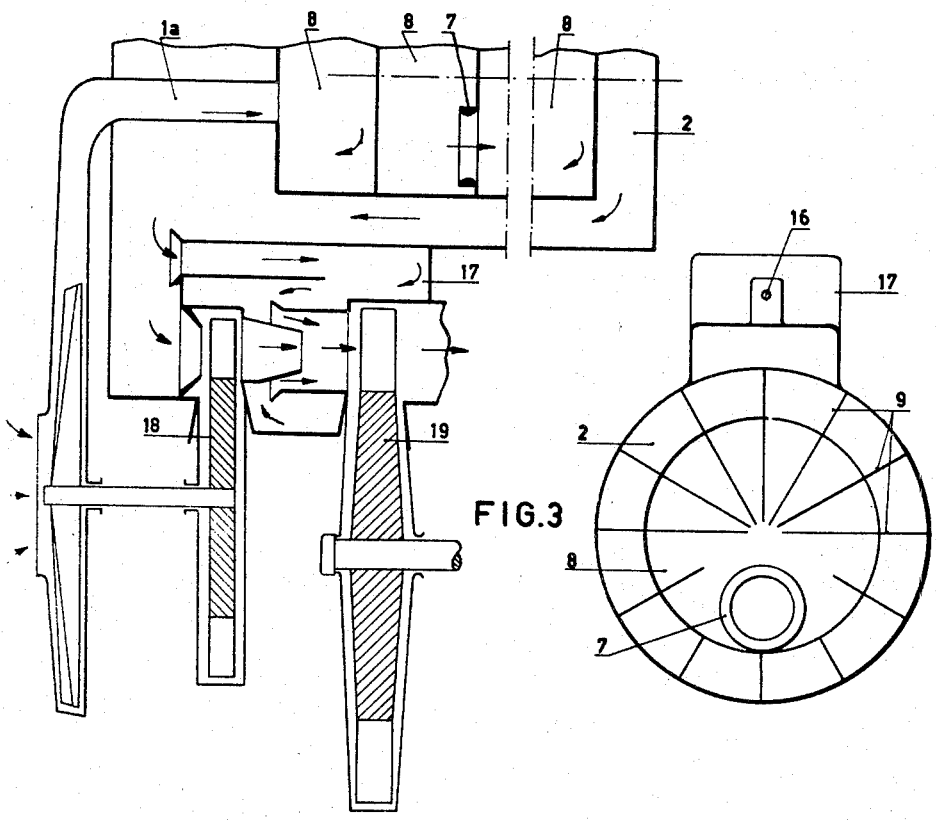

This invention relates to a gas generator comprising an air suction device, at least one combustion chamber with fuel injection device, and a compression device between the air suction device and the combustion chamber.

In conventional gas turbine plants and jet propulsion engines, in which atmospheric air is compressed by a compressor driven by a turbine disposed in the combustion gas flow, a substantial part of the energy available in this gas flow is taken up by said turbine, as a result of which the temperature in the combustion chamber(s) is greater than that which would be necessary in the absence of the said turbine in the combustion gas flow, for a given effective power output. In practice the limited thermal stress to which the turbine can be subjected restricts the efficiency of such installations.

The present invention aims at converting all or part of the supplied heat, directly into a pressure increase.

This is accomplished according to the invention. During the operation of the gas generator the air suction device is driven by part of the gases produced by the combustion chamber and is so constructed and designed that it accelerates the incoming air to sonic or supersonic velocity. The compression device comprises a number of consecutive stagnation chambers each of which is connected via one or more Venturi nozzles with the next stagnation chamber. The first stagnation chamber, viewed in the direction of the air flow, is connected to the outlet of the air suction device and the last stagnation chamber terminates in the combustion chamber, said combustion chamber being arranged around the stagnation chambers, whereby, also under the influence of heat transfer from the combustion chamber, the air in the stagnation chambers is compressed.

In the conventional gas turbine plant the air supplied by the compressor is raised in temperature before this air passes through the turbine which drives the compressor. In jet propulsion engines, characterised by low operating temperatures and the absence of moving and heavily loaded parts, cooling is not necessary and a compressor-turbine combination is superfluous, the jet propulsion engine having a relatively higher initial pressure, so that the gas generator according to the invention in a jet propulsion engine has a high efficiency and a very favourable power-weight ratio.

In particular when the generator according to the invention is used in a jet propulsion engine for aircraft it is preferable for the air suction device to be a Venturi pump, in the inlet to which a by-pass duct is provided, the said by-pass duct having a variable cross sectional area.

The low efficiency of such a Venturi pump does not greatly affect the total efficiency of the apparatus since the high air inlet velocity caused by the forward speed of the aircraft is utilised to produce the required suction.

If it is desired to increase further the efficiency of the generator according to the invention, additional gas may be supplied to the stagnation chambers from the combustion chamber through one or more of the Venturi nozzles, in such manner that the thickness of the boundary layer in the Venturi nozzles is reduced, resulting in smaller pressure losses in the nozzles as well as in a greater supply of heat to the stagnation chambers.

It is also possible to apply a combination of the generator according to the invention with a known installation. Thus the generator may be further provided with a turbine driven compressor for supplying part of the compression of the gases produced by the combustion chamber, the inlet of the said compressor constituting the said air suction device.

A higher compression is obtained if, according to the invention, the Venturi nozzles of the consecutive stagnation chambers are arranged in staggered fashion and if the cross-sectional area of consecutive Venturi nozzles decreases progressively.

The invention will be explained below with reference to the accompanying drawings showing by way of example two embodiments of the installation according to the invention.

FIGURE 1 shows diagrammatically a section of a jet propulsion engine including one embodiment of the generator according to the invention;

FIGURE 2 shows diagrammatically a section of a stationary gas turbine plant including an alternative embodiment of the invention; and FIGURE 3 is a cross-section taken along the line III—III of FIGURE 1.

Referring to FIGURES 1 and 3, a jet propulsion engine includes a Venturi pump 1 fed by a supply of gas from a combustion chamber 2, said gas escaping with supersonic velocity from an annular jet pipe 4 of the Venturi pump and having such an expansion that atmospheric air is sucked in by a jet pipe 3. The temperature of the suction gas at the outlet opening of the jet pipe 4 is approximately equal to the temperature of the sucked in air at the outlet opening of the jet pipe 3, and the ratio between the suction gas and the sucked in air is so selected as to maintain a supersonic velocity of the gas/air mixture. This ratio between the amounts of suction gas and sucked in air may be controlled by a compensation cone 5. At the end of the Venturi pump 1 there is provided a mixing tube 6, and the mixture flows to a stagnation chamber 8 in which the pressure of gas and air is increased by stagnation in said chamber. The compression thrust wave caused by this stagnation and by the required supply of heat from the combustion chamber, which will be discussed below more in detail, will not move upstream of the gas flow as long as the stagnation pressure does not exceed 2½ times the static pressure of the mixture flow in the mixing tube 6, if this mixture flow has a sonic or supersonic velocity. This is a well known phenomenon which has been described in the book of G. P. Sutton, "Rocket Propulsion Elements," 1949 edition, page 64. The mixture flow will therefore continue to flow without interruption. The pressure of the gas that flows into the stagnation chamber 8 with supersonic velocity exceeds, as a matter of fact, the pressure of the stagnation gas of increased pressure exerted on the surface of the flow passage of the Venturi pump 1. In series with said stagnation chamber 8 there is provided a number of further stagnation chambers 8, one behind the other according to FIGURE 1, the stagnation chambers 8 being interconnected by Venturi nozzles 7 respectively. After the first chamber 8 the pressure is increased progressively by stagnation in successive chambers 8. The rise in pressure is increased by transfer of heat from the combustion chamber 2 to these stagnation chambers. The heat transfer may be promoted by the provision of partitions 9 (FIGURE 3) which may extend radially if the combustion chamber 2 and the stagnation chambers 8 are of cylindrical construction. In that case the combustion chamber 2 is arranged as an annular chamber around the stagnation chambers 8. The said heat transfer may also be promoted by, for example, the provision of steel shavings or the like in the stagnation chambers 8. The Venturi nozzles 7 are designed in accordance with the prevailing pressures, temperatures and flow velocities, successive Venturi nozzles 7 being staggered and having progressively smaller cross-sections, so that the gases, after passing through each Venturi nozzle 7, recover their supersonic velocity. On account of the stagnation and rise in temperature in the next chamber, the pressure can be increased again to 2½ times the static discharge pressure of the preceding Venturi nozzle 7. The decrease in pressure required to impart this supersonic velocity to the gases is less than the increase in pressure in passing from one stagnation chamber 8 to the adjacent chamber 8.

It is also possible to have the heat transfer from the combustion chamber 2 effected by means of a supply of gas from the combustion chamber 2 to the stagnation chambers 8 directly e.g. by a supply to the Venturi nozzles 7, it being possible to obtain thereby a decrease in the thickness of the boundary layer in the nozzles 7 so that smaller pressure losses are suffered therein. Provision may also be made for a direct injection of fuel in the stagnation chambers 8.

Viewed in the direction of the gas flow the cross-section of successive Venturi nozzles 7 becomes smaller, the pressure in successive stagnation chambers 8 increasing progressively, and for continuous operation an equal amount of mixture must pass in a given time through each Venturi nozzle 7. The number of stagnation chambers 8 is limited since the pressure loss across the Venturi nozzles 7 increases on account of the progressively rising gas temperature and the progressively decreasing cross-sections of the Venturi nozzles 7.

In the combustion chamber 2 a burner 10 with fuel injection means 10′ is provided for the combustion of a fuel, e.g. hydrocarbon. The rate of operation of the Venturi pump 1 is adjusted to the required rate of combustion at the burner 10. Part of the combustion gases equal to the amount of the sucked in air, passes from the combustion chamber 2 and flows to a further chamber 17 in which further fuel injection may take place to vary the propulsive thrust of the jet engine. The further chamber 17 discharges into a propulsion nozzle 11 within which there is arranged an axially adjustable reaction cone 16. Movement of the cone 16 axially varies the outlet area of the propulsion nozzle 11 and thus varies the propulsive thrust produced thereby.

In principle there is no restriction on the capacity of the combustion chamber 2 so that the gas flow velocity through chamber 2 may be maintained at a very low value and the time which the gases spend in the combustion chamber 2 can be easily adapted to the rate of heating of the gases therein. It is to be noted that on account of the absence of a turbine (e.g. for driving a mechanical compressor) in the further chamber 17 and the duct leading thereto, the outlet area of the propulsion nozzle 11 and the velocity of the gases discharged therethrough may be small relative to those employed in conventional jet propulsion engines, so that the combustion gases may be simply conveyed by pipes. Consequently more than one jet propulsion nozzle, located, for example, at different points in an aircraft, may be supplied from one combustion chamber, a feature with obvious aerodynamic advantages. Also, in contrast to conventional jet propulsion engines, the provision of propulsion jet deflection devices for braking purposes, is simply achieved.

With supersonic flying speeds of Mach 1.22 or higher the stagnation pressure of the air sucked in by the Venturi pump 1 would become greater than the maximum permissible pressure. The compression thrust wave would then be able to travel against the direction of flow of inlet air and would prevent the supply of inlet air. In order to prevent this, there is provided an annular by-pass duct 12 around the inlet of the Venturi pump 1 so that surplus air may be discharged via a rearwardly directed discharge nozzle, the outlet area of which is adjustable by an axially movable cone 13. In order to augment the propulsive jet thrust, additional fuel injectors and an ignition device (not shown) may be provided in said discharge nozzle.

Apparatus according to the invention can be started by means of starting gases consisting of compressed air or gases under pressure produced by starting cartridges. The starting gases may be introduced through a starting gas valve 14, the combustion chamber 2 having been previously isolated from the Venturi pump 1 by closure of an annular valve 15, so that the starting gases can only escape via the jet pipe 4, thereby putting the Venturi pump 1 into operation.

FIGURE 2 shows an alternative embodiment of apparatus according to the invention installed in a stationary gas turbine plant. In this case there is, of course, no ram air which may be utilised in a Venturi pump, so that the latter is therefore replaced by a compressor (not shown) driven by a turbine 18. A power turbine 19 driven by the combustion gases is provided downstream of turbine 18. The temperatures to which the turbines 18 and 19 are subjected are not so high as those to which the turbines in conventional plants are subjected.

According to FIGURE 2 the turbines 18, which drives the compressor (not shown), is fed either with gas from the combustion chamber 2 close to the burner 10, that is, before this gas has transmitted heat to the stagnation chambers 8, or with gas from the upstream part of the combustion chamber 2, that is, after the gas has transferred heat to the stagnation chambers 8. The choice between these alternatives depends on the permissible thermal stress of the turbine 18. A further combustion chamber 17 may be provided upstream of the power turbine 19, the supply of fuel to the chamber 17 controlling the power with which the turbine 19 is driven. The turbine 18 is driven by the main combustion gases independently of the load on the power turbine 19.

The compressor draws in atmospheric air and accelerates it to sonic or supersonic velocity before passing it into the stagnation chambers 8 via a tube 1a, whereupon further compression of the air follows as described in the first embodiment.

Starting the plant according to FIGURE 2 may be effected simply by rotating the compressor at a predetermined minimum speed, e.g. by means of an electric starting motor (not shown).

I claim:

1. A gas generator comprising an air suction device, at least one combustion chamber with fuel injection device and a compression device between the air suction device and the combustion chamber, said compression device having a number of consecutive stagnation chambers separated by intermediate walls, one or more venturi nozzles in each intermediate wall, an outlet tube for the air suction device, said outlet tube opening into the first of the said stagnation chambers, viewed in the direction of air flow, one or more venturi nozzles in an end wall of the compression device opening into the combustion chamber, the said chamber being arranged around the said stagnation chambers and having an outlet for the generated gas.

2. A gas generator comprising a gas jet pump, at least one combustion chamber with fuel injection device and a compression device between the gas jet pump and the combustion chamber, said compression device having a number of consecutive stagnation chambers separated by intermediate walls, one or more venturi nozzles in each intermediate wall, an outlet tube for the gas jet pump, said outlet tube opening into the first of the said stagnation chambers, viewed in the direction of air flow, one or more venturi nozzles in an end wall of the compression devices opening into the combustion chamber, the said chamber being arranged around the said stagnation chambers and having an outlet for the generated gas, a by-pass channel being provided between an air inlet opening of the gas jet pump and a jet nozzle with regulable cross-section.

3. A gas generator comprising an air suction device, at least one combustion chamber with fuel injection means and a compression device between the air suction device and the combustion chamber, said compression device having consecutive stagnation chambers separated by intermediate walls, at least one venturi nozzle in each intermediate wall, an outlet tube for the air suction device, said outlet tube opening into the first of the said stagnation chambers, viewed in the direction of air flow, at least one venturi nozzle in an end wall of the compression device opening into the combustion chamber, the said chamber being arranged around the said stagnation chambers and having an outlet for the generated gas, a gas turbine driven mechanical gas compressor being provided in the gas flow of the generator for supplying part of the compression of the gases produced by said generator.

4. A gas generator comprising an air compressor, at least one combustion chamber with fuel injection means and a compression device between the air compressor and the combustion chamber, said compression device having consecutive stagnation chambers separated by intermediate walls, at least one venturi nozzle in each intermediate wall, an outlet tube for the air compressor, said outlet tube opening into the first of the said stagnation chambers, viewed in the direction of air flow, at least one venturi nozzle in an end wall of the compression device opening into the combustion chamber, the said chamber being arranged around the said stagnation chambers and having an outlet for the generated gas, the air compressor being coupled to a gas turbine driven by part of the gases generated in the said combustion chamber.

5. A gas generator according to claim 2, wherein the said combustion chamber is arranged coaxially around the said consecutive stagnation chambers assembly, comprising preferably radial partitions extending through the said chamber and through the said stagnation chambers thus promoting heat transfer from the combustion chamber to the stagnation chambers.

6. A gas generator according to claim 2, wherein the venturi nozzles in the walls of the compression device are arranged in staggered fashion from one wall to another.

7. A gas generator according to claim 3, wherein the said combustion chamber is arranged coaxially around the said consecutive stagnation chambers assembly, comprising preferably radial partitions extending through the said chamber and through the said stagnation chambers thus promoting heat transfer from the combustion chamber to the stagnation chambers.

8. A gas generator according to claim 3, wherein the venturi nozzles in the walls of the compression device are arranged in staggered fashion from one wall to another.

9. A gas generator according to claim 4, wherein the said combustion chamber is arranged coaxially around the said consecutive stagnation chambers assembly, comprising preferably radial partitions extending through the said chamber and through the said stagnation chambers thus promoting heat transfer from the combustion chamber to the stagnation chambers.

10. A gas generator according to claim 4, wherein the venturi nozzles in the walls of the compression device are arranged in staggered fashion from one wall to another.

11. A gas generator comprising a venturi pump, at least one combustion chamber with fuel injection means and a compression device between the venturi pump and the combustion chamber, said compression device having consecutive stagnation chambers separated by intermediate walls, at least one venturi nozzle in each intermediate wall, an outlet tube for the venturi pump, said outlet tube opening into the first of the said stagnation chambers, viewed in the direction of air flow, at least one venturi nozzle in an end wall of the compression device and opening into the combustion chamber, the said chamber being arranged around the said stagnation chambers and having an outlet for the generated gas and a by-pass channel being provided between an air inlet opening of the venturi pump and a jet nozzle with variable cross sectional area.

12. A gas generator comprising an air compressor, at least one combustion chamber with fuel injection means and a compression device between the air compressor and the combustion chamber, said compression device having consecutive chambers separated by intermediate walls, at least one venturi nozzle in each intermediate wall, an outlet tube for the air compressor, said outlet tube opening into the first of the said stagnation chambers, viewed in the direction of air flow, at least one venturi nozzle in an end wall of the compression device and opening into the combustion chamber, the said chamber having an outlet for the generated gas, the air compressor being coupled to a gas turbine driven by part of the gases generated in the said combustion chamber, the said combustion chamber being arranged coaxially around the said consecutive stagnation chambers assembly, preferably radial partitions extending through the said combustion chamber and through the said stagnation chambers thus promoting heat transfer from the combustion chamber to the stagnation chambers, the venturi nozzles in the walls of the compression device being arranged in staggered fashion from one wall to another.

13. A gas generator according to claim 1 wherein the said combustion chamber is arranged coaxially around the said consecutive stagnation chambers assembly, comprising preferably radial partitions extending through the said chamber and through the said stagnation chambers thus promoting heat transfer from the combustion chamber to the stagnation chambers.

14. A gas generator according to claim 1, wherein the venturi nozzles in the walls of the compression device are arranged in staggered fashion from one wall to another.

15. A gas generator comprising a venturi pump, at least one combustion chamber with fuel injection means and a compression device between the venturi pump and the combustion chamber, said compression device having consecutive stagnation chambers separated by intermediate walls, at least one venturi nozzle in each intermediate wall, an outlet tube for the venturi pump, said outlet tube opening into the first of the said stagnation chambers, viewed in the direction of air flow, at least one venturi nozzle in an end wall of the compression device and opening into the combustion chamber, the said chamber having an outlet for the generated gas, a by-pass channel provided between the air inlet opening of the venturi pump and a jet nozzle with variable cross-sectional area, the said combustion chamber being arranged coaxially around the said consecutive stagnation chambers assembly, preferably radial partitions extending through the said combustion chamber and through the said stagnation chambers thus promoting heat transfer from the combustion chamber to the stagnation chambers, the venturi nozzles in the walls of the compression device being arranged in staggered fashion from one wall to another.

References Cited by the Examiner

UNITED STATES PATENTS

| 1,137,767 | 5/15 | Leblanc | 230—111 |
| 1,867,325 | 7/32 | Neville | 60—29 |

FOREIGN PATENTS

| 114,413 | 12/41 | Australia. |
| 19,673 | 8/97 | Great Britain. |
| 229,420 | 5/30 | Great Britain. |
| 134,462 | 10/29 | Switzerland. |

SAMUEL LEVINE, *Primary Examiner.*